Nov. 12, 1946.   H. T. BORSHEIM   2,411,125
SEAT CONSTRUCTION
Filed Jan. 1, 1943.   2 Sheets-Sheet 1
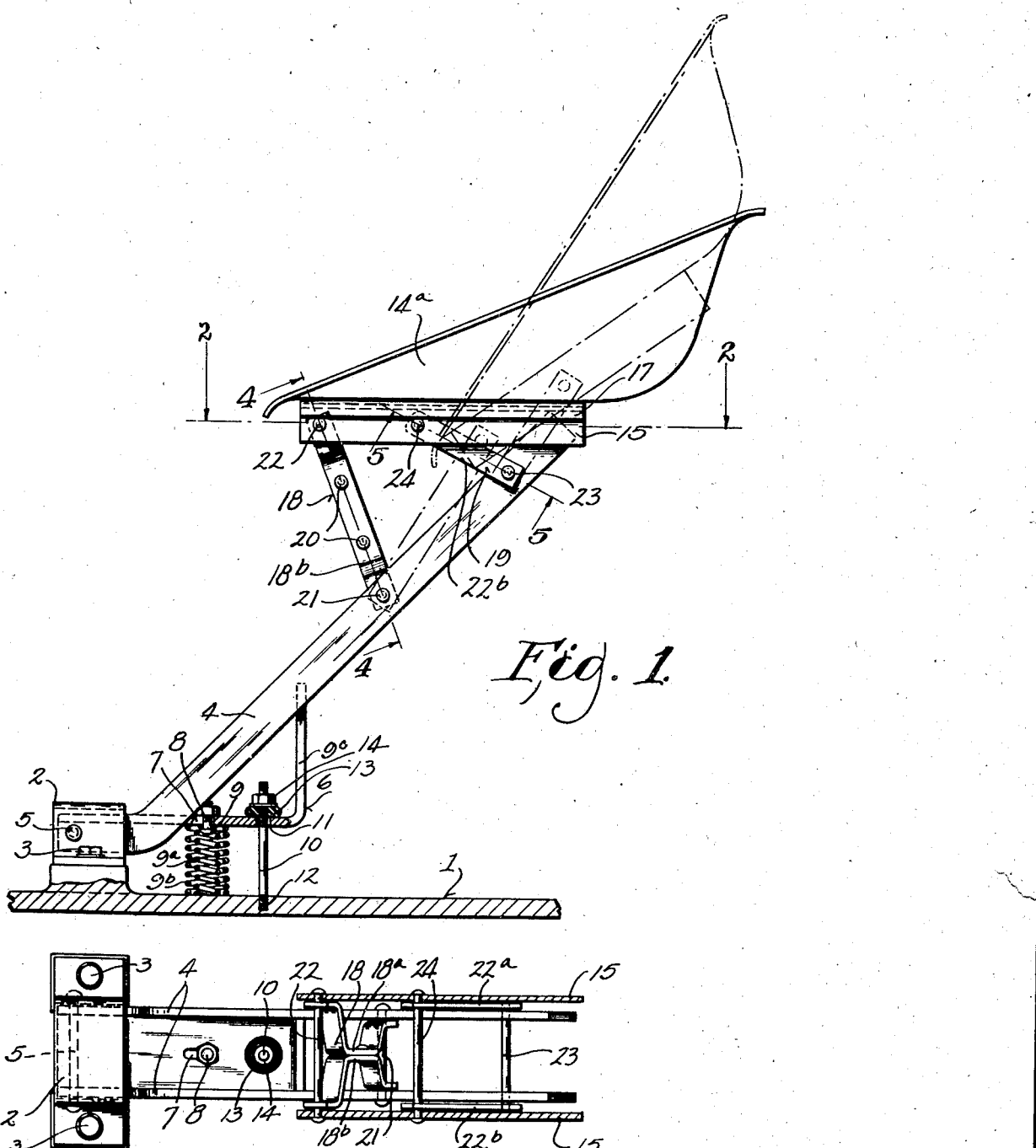

Nov. 12, 1946.  H. T. BORSHEIM  2,411,125
SEAT CONSTRUCTION
Filed Jan. 1, 1943  2 Sheets-Sheet 2

INVENTOR
Hans T. Borsheim
BY Emerson B. Donnell
ATTORNEY

Patented Nov. 12, 1946

2,411,125

UNITED STATES PATENT OFFICE 2,411,125

SEAT CONSTRUCTION

Hans T. Borsheim, Davenport, Iowa, assignor to J. I. Case Company, Racine, Wis., a corporation Application January 1, 1943, Serial No. 471,029

5 Claims. (Cl. 155—51)

The present invention relates to seats of a kind most generally used on tractors, farm machines or vehicles where these find use, and an object of the invention is to generally improve the construction and operation of devices of this class. A further object of my invention is to provide a seat that serves two purposes in farm use. A further object is to provide a seat which is adapted to cushion the bumps and vibration present in a tractor or implement when operating and to save an operator on said seat from a large part of the discomfort otherwise attendant on the operation of such a vehicle.

Other objects are to provide a seat that is structurally strong, compact, economical for manufacture and of good appearance.

A further object is to provide for folding of the seat into an inoperative position so that the operator may stand while operating the implement, the position of the seat being such that rain, snow, dirt, etc., will not remain on the seat, owing to the inclination thereof, so that the seat will be relatively clean when it is next to be used.

Since many tractors operate on steel wheels with long lugs on the wheel rim for traction, there is bound to result a very rough bumpy reaction particularly on hard surfaces and frozen ground which is overcome by a spring member in compression and counteracted by a flexible snubbing member to tend to even out these bumps.

Since these operators often find it convenient and sometimes necessary to stand up while operating the tractor in the field, a device to permit folding the seat out of the way is desirable to make more leg room. Then too, since these tractors stand out-doors so much and since the seats are bucket shaped, there is a tendency for them to collect rain or snow and even dirt in their normal position. Therefore, this device to permit folding this seat rearwardly and in a partial vertical position accomplishes a useful purpose in keeping the seat clear and ready for use at any time it is returned to its operative position.

These objects are successfully accomplished in the invention here set forth and described, wherein a satisfactory embodiment of the invention is shown. However, it is to be understood that the invention is not limited to the details disclosed but includes all such variations and modifications as fall within the spirit of the invention as herein expressed.

Figure 1 is a side view with parts broken away of the seat and its various members and supporting parts as they appear on a tractor.

Fig. 2 is a plan view of the arrangement shown in Fig. 1 in section on the line 2—2 of Fig. 1, omitting certain parts for clearly showing the construction.

Figure 3:
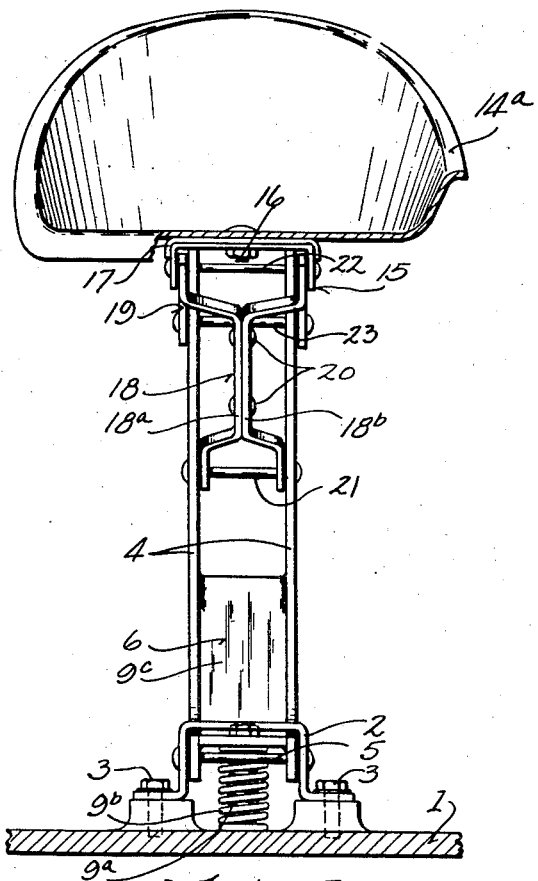
Fig. 3 is a front view of the device.

As seen in Fig. 1, this invention is shown secured to a tractor frame 1 on top of which is bolted a stirrup 2 held in place by cap screws 3—3, although it is to be understood that the seat is not limited to use with a tractor but may be applied to any machine or implement where a seat of this character is required. Hingedly connected to this stirrup is the seat support member made up of a pair of steel bars 4—4 securely welded together as a unit and pivoted at a pin 5 carried by stirrup 2, allowing the seat a limited vertical swinging movement.

A flat plate member 6, a part of the seat support, is welded into and between the members 4 to unite them, as above, and is provided with a slot 7 through which a bolt 8 passes downwardly. Bolt 8 has a head 9 about which are arranged flexible compression springs 9a and 9b between the underside of flat plate member 6 and frame 1. These springs are compressed by the action of the operator sitting in the seat when operating the tractor or implement, and one of the convolutions of spring 9a is engaged by head 9 and securely clamped against plate member 6. The slot 7 permits shifting the spring in a direction to provide a change in leverage as related to pin or fulcrum 5, in proportion to the weight of the operator on the seat 9, and it is contemplated that in the event of a very light operator, one of the springs 9a or 9b may be omitted.

Other suitable or well-known means is contemplated for fastening spring 9a to plate 6. Plate 6 has a portion 9c extending upwardly and rejoining bars 4—4 to brace portion 6 and make this a rigid part of the seat support.

A stud 10 passing through the plate member 6 at an opening 11 and secured to frame 1 at 12 is preferably provided with a flexible snubbing block or stop member 13 to check the upward travel of the seat without shock, in the event of full upward travel of the seat caused by extremely rough going or by other influences. It may be set tight or loose by a nut 14 to suit the operator's choice of upper position of the seat for comfort and safety, and, within the contemplation of the invention, an additional spring may be disposed about stud 10 if the operator is unusually heavy.

Figure 4:
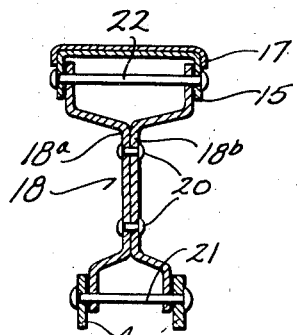
Fig. 4 is a sectional view on the line 4—4 of Fig. 1 to show certain mechanism indicated in Fig. 1.

A seat pan 14ª is securely held in place in the present instance on a seat saddle 15, as for example by a bolt 16, Fig. 3. A reinforcing piece 17 is preferably introduced between seat 14ª and seat saddle 15 for added strength to afford a safety measure in making doubly sure that the seat and saddle are securely held together by said bolt 16. Seat saddle 15 is of channel section as may be clearly seen in Figs. 3, 4 and 5.

As above suggested, this seat pan assembly or unit is so supported on support member 4—4 that its location may be changed to provide for a standing position of the operator. In the present instance, channel member 15 rests at its rear portion upon support member 4—4 as indicated in Fig. 1 and is maintained in this position by swinging links 18 and 19. Link 18 connects the forward portion of channel member 15 with support bars 4—4 at a point substantially below and somewhat to the rear of the point of connection of said link with channel 15. In the present instance, link 18 comprises a pair of bar or strip members 18ª and 18ᵇ united at their mid portions by suitable means, as for instance rivets 20—20 and spread apart at their ends to provide a bifurcated effect. The resulting link 18 is pivoted to supporting bars 4—4 on a pin 21 which extends between bars 4—4 and in the present instance is united thereto, as for example by welding. In this manner, pin 21 serves to brace bars 4—4 and assist portion 9ᵇ in maintaining the desired relation between the bars. At its other end, link 18 is pivoted to channel 15 by means of a pin 22 which, in the present instance, is suitably united with channel 15 as by welding.

Figure 5:
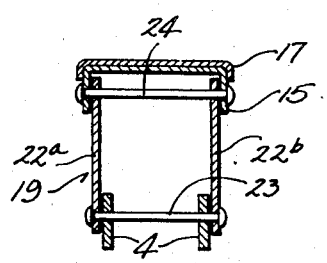
Fig. 5 is a sectional view on line 5—5 of Fig. 1.

Link 19 is of slightly different construction comprising in the present instance bar members 22ª and 22ᵇ Fig. 5, united by a pin 23 fixed for example by welding to the bar members 22ª and 22ᵇ and pivotally supported in support members 4—4. Link 19 also engages a pin 24 extending across channel 15 and which pivotally connects link 19 with the seat pan unit. Link 19 connects a point substantially at the middle of channel 15 with a point somewhat below and to the rear on support member 4—4. It will now be apparent that the weight of an operator on seat pan unit 14ª will tend to cause clockwise rotation of the seat pan unit as seen in Fig. 1 so that it will rest firmly on the top of support members 4—4. The spaced apart position of members 4—4, together with the bifurcated end of link 18, result in a stable supporting action on pan 14ª. It will also be apparent that lifting of pan unit 14ª at the back thereof will cause counterclockwise rotation of the same with swinging of links 18 and 19 about pivot pins 21 and 23, respectively. The location of pivot pins 21 and 23 and also the location of pivot pins 22 and 24, together with the lengths of links 18 and 19, are so chosen that this motion will finally result in a position of seat pan 14ª such as indicated by dotted lines in Fig. 1. At this point, link 18 will have folded back against supports 4—4, while link 19 will have rotated past a vertical position into a position inclined somewhat to the rear. The downward thrust of the weight of pan unit 14ª then causes a tendency in link 19 to continue this rearward swinging movement but which movement is prevented by the abutment of link 18 against supports 4—4. For this reason, the seat remains in the upward position indicated without the use of detents, latches or the like.

In general, the proportion of links 18 and 19 and their locations for this result, are such that link 18 is relatively long and inclined forwardly, whereas link 19 is relatively short and inclined forwardly at a substantially sharper angle than link 18.

It will be noted that in this position of the seat, there is considerably more room in front of the seat than there is when the seat is "down" in its operative position. This gives increased room on the platform in case the operator prefers to stand while operating. Furthermore, the inclination of the pan unit in the "up" position is sufficient so that snow, rain or dirt will drain or fall out of the pan when it is in this position and not accumulate to constitute an annoyance when the seat is again to be used.

Furthermore, it will be apparent that the weight of an operator will tend to swing support members 4—4 about pivot pin 5. This movement will be resisted by spring 9ª with a resilient force which will cushion the shocks of driving the tractor or implement over rough surfaces. By loosening bolt 8, it may be shifted in slot 7 together with spring 9ª so that the lever arm from pivot 5 may be adjusted to suit the weight of the operator customarily using the seat. Upward movement of supports 4—4, is resisted by the resilient stop 13 anchored by stud or the like 10 and the position of which may be adjusted by manipulation of nut 14.

The above being a complete description of an illustrative embodiment of the invention, and which is adapted to accomplish the objects set forth above, what is claimed as new and desired to be secured by Letters Patent of the United States is:

1. A seat support comprising spaced bars inclined and pivotally connected to an implement or support, a plate interposed between the bars for bracing and providing a substantially horizontally extending portion having a part extending upwardly and rejoining the inclined bars, a spring interposed between the implement and said substantially horizontally extending portion, for supporting it against downward swinging movement about said pivotal connection, means for adjusting said spring toward and away from said pivotal connection for varying the leverage to suit the weight of an operator on said seat, a stop engaging said horizontally extending portion to limit upward movement thereof, means for anchoring said stop in desired position to determine the altitude of the upper end of said seat support, and said stop comprising a rubber cushioning element to avoid shock upon reaching the upward limit of movement of said seat support defined by said stop.

2. A seat support comprising an inclined bar pivotally connected to an implement or support, and having a portion extending at an angle to said inclined bar, a spring interposed between the implement or support and said extending portion for sustaining it against downward swinging on the pivot, means for adjusting said spring toward and away from said pivot for varying the leverage to suit the weight of an operator on said seat, a stop engaging said extending portion to limit upward movement thereof, means for anchoring said stop in desired position to determine the altitude of the upper end of said seat supporting bar, and said stop comprising a cushioning element to avoid shock upon reaching the upper limit of movement of said seat supporting bar defined by said stop.

3. A seat construction including a seat pan unit, a pair of spaced apart bars comprising a support for said unit, said bars inclining upwardly and backwardly from a point below and in front of said seat pan unit, and lying substantially beneath the longitudinal center portion of said unit, said support being spaced beneath said unit at the front thereof, and in contact with said unit at a point rearwardly of the center of said unit, a relatively long bifurcated link connecting laterally spaced points on the front of said unit to the spaced apart bars of said support at a pivot point below and to the rear of the front portion of said unit, and a short link connecting a point rearwardly of the front of said unit with a point on said support rearwardly and upwardly of the point of connection of the other link with said support.

4. A seat construction, including a seat pan unit, a bar comprising a support for said unit, said bar inclining upwardly and backwardly from a point below and in front of said seat pan unit and lying substantially beneath the longitudinal center portion of said unit, said support being spaced beneath said unit at the front thereof and in contact with said unit at a point rearwardly of the center of said unit, a relatively long link connecting the front of said unit to said bar at a pivot point below and to the rear of the front portion of said unit, and a short link connecting a point rearwardly of the front of said unit with a point on said support rearwardly and upwardly of the point of connection of the other link with said support.

5. A seat construction including a seat pan, a saddle member substantially beneath the longitudinal center of the seat pan, and to which said pan is rigidly attached, a bar comprising a support for the seat, said bar inclining upwardly and backwardly from a point below and in front of said saddle, and lying substantially beneath the longitudinal center portion of said saddle, said support being spaced beneath said saddle at the front thereof and in contact with said saddle at a point rearwardly of the center thereof, a relatively long link connecting the front of said saddle to said bar at a pivot point below and to the rear of the front portion of said saddle, and a short link connecting a point rearwardly of the front of said saddle with a point on said bar rearwardly and upwardly of the point of connection of the other link with said support.

HANS T. BORSHEIM.